(12) United States Patent
Van Der Veen et al.

(10) Patent No.: US 9,655,176 B2
(45) Date of Patent: May 16, 2017

(54) LED LIGHT SOURCE

(71) Applicant: PHILIPS LIGHTING HOLDING B.V., Eindhoven (NL)

(72) Inventors: Geert Willem Van Der Veen, Eindhoven (NL); Wilhelmus Josephus Cornelissen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 103 days.

(21) Appl. No.: 14/384,047

(22) PCT Filed: Feb. 22, 2013

(86) PCT No.: PCT/IB2013/051437
§ 371 (c)(1),
(2) Date: Sep. 9, 2014

(87) PCT Pub. No.: WO2013/132379
PCT Pub. Date: Sep. 12, 2013

(65) Prior Publication Data
US 2015/0069925 A1    Mar. 12, 2015

Related U.S. Application Data

(60) Provisional application No. 61/608,696, filed on Mar. 9, 2012.

(51) Int. Cl.
*H05B 37/02* (2006.01)
*H05B 33/08* (2006.01)

(52) U.S. Cl.
CPC ..... *H05B 33/0815* (2013.01); *H05B 33/0806* (2013.01); *H05B 33/0824* (2013.01);
(Continued)

(58) Field of Classification Search
CPC ............ H05B 33/0815; H05B 33/0824; H05B 33/083; H05B 37/02; Y02B 20/346; Y02B 20/347; Y02B 70/126; Y02B 70/1491
(Continued)

(56) References Cited

U.S. PATENT DOCUMENTS 7,999,485 B1 * 8/2011 Richards ............ H05B 33/0854
315/177
2003/0146716 A1    8/2003 Crouse
(Continued)

OTHER PUBLICATIONS

Siliconix, Application note 102: "JFET Biasing Techniques", Mar. 10, 1997.*
(Continued)

*Primary Examiner* — Thai Pham
*Assistant Examiner* — Borna Alaeddini

(57) ABSTRACT

The invention relates to a LED light source comprising: input terminals (K1, K2) for connection to a mains voltage supply source, a rectifier (RB) coupled to the input terminals for rectifying the mains supply voltage supplied by the mains supply voltage source and comprising rectifier output terminals, a DC-DC converter (CONV) for generating a DC current out of the rectified mains supply voltage, comprising converter input terminals connected to the rectifier output terminals and comprising a first converter output terminal (A) and a second converter output terminal (B), —a LED load (LL) with an anode coupled to the first converter output terminal via a current control element (D5) for blocking a current flowing from the anode of the LED load to the first converter output terminal, and with a cathode coupled to the second converter output terminal via a first controllable switch (M1) having a control electrode coupled to first control circuitry for rendering the controllable switch non-conductive in case the LED light source is in standby mode.

15 Claims, 5 Drawing Sheets

(52) U.S. Cl.
CPC ............ *H05B 33/083* (2013.01); *H05B 37/02* (2013.01); *Y02B 20/346* (2013.01); *Y02B 20/347* (2013.01); *Y02B 70/126* (2013.01); *Y02B 70/1491* (2013.01)

(58) Field of Classification Search
USPC ............ 315/291, 307, 185 R, 119, 125, 127; 323/282; 363/89
See application file for complete search history.

(56) References Cited

U.S. PATENT DOCUMENTS

| | | | | |
|---|---|---|---|---|
| 2004/0170037 | A1* | 9/2004 | Bucks | H05B 33/0815 363/89 |
| 2008/0111528 | A1* | 5/2008 | Wang | H05B 33/0815 323/282 |
| 2009/0289559 | A1* | 11/2009 | Tanaka | H05B 33/0827 315/185 R |
| 2010/0156322 | A1 | 6/2010 | Sun | |
| 2011/0057573 | A1 | 3/2011 | Jutras | |
| 2011/0109249 | A1 | 5/2011 | Liu | |
| 2011/0204820 | A1 | 8/2011 | Tikkanen | |
| 2012/0104962 | A1* | 5/2012 | Chen | H05B 33/0827 315/228 |

OTHER PUBLICATIONS

"PMOLED Display Power Supply", STOD2540, STMicroelectronics, Doc ID 12204 Rev 10, Jul. 2010, pp. 1-20 www.st.com.
"500mW Boost Converter for White LEDs", Semiconductor Components Industries, LLC, 2007, Publication NCP5010, Mar. 2007—Rev. 2, pp. 1-18 www.onsemi.com.
"High-Efficiency PWM LED Driver with Boost Converter and Five Constant-Current GPIO Ports", MWX6948B, 2009 Maxim Integrated Products Inc., 19-4935, Rev 0, Sep. 2009, pp. 1-28.
Day, M., "LED_Driver Consideration", Power Management, Texas Instruments Incorporated, Analog and Mixed-Signal Products, 1Q 2004, Analog Applications Journal, pp. 14-18 www.ti.com/sc/analogapps.
"iDrive(TM) Quad", Integrated Systems Technologies Ltd. 2010, User Manual Quad v1-5 Feb. 24, 2011, pp. 1-23.
"Boost Converter with Dynamic Output Voltage Programming has Small Footprint", Dataweek Electronics & Communications Technology, Issue Date: Sep. 20, 2006, pp. 1-3 http://www.dataweek.co.za/news.aspx?pklnewsid=22370 Dec. 19, 2011.

\* cited by examiner

LED LIGHT SOURCE

CROSS-REFERENCE TO PRIOR APPLICATIONS

This application is a U.S. national stage application under 35 U.S.C. §371 of International Application No. PCT/IB2013/051437, filed on Feb. 22, 2013, which claims priority benefit under 35 U.S.C. §119(e) of U.S. Provisional Application No. 61/608,696 filed on Mar. 9, 2012, the contents of which are herein incorporated by reference.

FIELD OF THE INVENTION

The invention relates to the field of LED light sources. More in particular, the invention relates to LED light sources equipped with a standby function, in other words the operation of the LED light source can be stopped while the mains supply is still connected to it.

BACKGROUND OF THE INVENTION

Lighting systems based on LEDs are used on an increasing scale. LEDs have a high efficiency and a long life time. In many lighting systems, LEDs also offer a higher optical efficiency than other light sources. As a consequence, LEDs offer an interesting alternative for the well known light sources such as fluorescent lamps, high intensity discharge lamps or incandescent lamps.

LED light sources are often comprised in a lighting system, wherein the operation of the LED light sources is controlled by control commands. Such control commands include commands for activating the LED light source and commands for stopping the operation of the LED light source, i.e. commands to start generating a LED current and commands to stop generating a LED current, respectively. In the latter case, operation is not stopped by interrupting the connection of the LED light source to the mains supply but by stopping for instance the operation of a converter circuit comprised in the LED light source. In this latter case, the LED light source is said to be in standby mode. In this standby mode, since the mains supply is still connected to the LED light source, the LED light source is still capable to receive further commands and process those commands. At the same time, however, the mains supply may cause a leakage current through parasitic capacitances and (part of) the LED load comprised in the LED light source. This leakage current can cause the LED string to generate a small amount of light resulting in a glow effect that is often undesirable.

SUMMARY OF THE INVENTION

It is an object of the invention to provide a LED light source that does not generate a small amount of light caused by leakage currents when it is in standby mode.

According to a first aspect of the invention, a LED light source is provided, comprising:

input terminals for connection to a mains voltage supply source, a rectifier coupled to the input terminals for rectifying the mains supply voltage supplied by the mains supply voltage source and comprising rectifier output terminals, a DC-DC-converter for generating a DC current out of the rectified mains supply voltage, comprising converter input terminals connected to the rectifier output terminals and comprising a first converter output terminal and a second converter output terminal, a LED load with an anode coupled to the first converter output terminal via a current control element for blocking a current flowing from the anode of the LED load to the first converter output terminal, and with a cathode coupled to the second converter output terminal via a first controllable switch having a control electrode coupled to first control circuitry for rendering the first controllable switch non-conductive in case the LED light source is in standby mode.

During operation, a current supplying the LEDs can flow through the current control element and also through the first controllable switch that is maintained in the conductive state. In case the LED current supplied to the LED load by the converter is stopped, the LED light source is in a standby state and the first controllable switch is rendered non-conductive. As a result, leakage currents flowing from the mains supply to the LED load via parasitic capacitances are effectively suppressed, so that the LEDs do not generate a small amount of light during the standby state.

According to a further aspect of the invention, a method is provided for suppressing the leakage current through the LED load of a LED light source during standby, said LED light source comprising:

a rectifier for connection to the mains supply and for rectifying a mains supply voltage, a LED load, and a DC-DC-converter coupled between the rectifier and the LED load, a protective earth terminal connected to the neutral of the mains supply and coupled to the LED load by means of parasitic capacitances, the method comprising the following steps:

after the operation of the LED light source has stopped and the LED light source is in the standby mode, blocking the flow of current from an anode of the LED load to the rectifier by means of a current control element, and blocking the flow of current from a cathode of the LED load to the rectifier, by making a first controllable switch in the current path non-conductive.

A method according to the invention effectively suppresses leakage currents that otherwise flow through the parasitic capacitances and cause the LED load to generate a small amount of light.

The current control element is preferably implemented as a diode or a further controllable switch having a control electrode coupled to further control circuitry for rendering the further controllable switch non-conductive in case the LED light source is in standby mode. Both the current control element and the first controllable switch may comprise a FET or a relais.

In a first preferred embodiment, the control circuitry used for rendering the first controllable switch non-conductive in case the LED light source is in standby mode, comprises a voltage divider comprising a series arrangement of a first resistor and a second resistor connecting the first converter output terminal to the second converter output terminal and a control electrode of the first controllable switch is coupled to a terminal between the first resistor and the second resistor.

In case the operation of the DC-DC-converter is stopped because the LED light source is going into standby mode, the voltage between the converter output terminals decreases, so that also the voltage at the control electrode of the controllable switch drops to a voltage so low that the first controllable switch becomes non-conductive.

In this way, the first control circuitry is realized in a cheap and dependable way.

In a further preferred embodiment, the DC-DC-converter comprises a transformer equipped with a primary winding and a secondary winding and a capacitor is coupled between the primary winding and the secondary winding.

The capacitor can be a separate component, for instance a capacitor for suppressing EMI. The capacitor can also be a parasitic capacitor.

The transformer causes the LED light source to become an isolated LED light source. Although the transformer provides isolation between the LED load and the mains supply, due to the presence of the capacitor coupled between primary and secondary winding, the transformer does not sufficiently suppress leakage currents that flow from the mains supply through parasitic capacitances and through the LEDs to prevent that the LEDs generate a small amount of light. However, it has been found that the present invention also effectively suppresses leakage currents in isolated LED light sources in case they are in the standby state.

In another preferred embodiment of a LED light source according to the invention, the standby mode is entered by stopping the operation of the DC-DC converter, and the control circuitry for rendering the first controllable switch non-conductive in case the LED light source is in standby mode, is comprised in a converter control circuit (see FIG. 5) comprised in the DC-DC converter, and the control electrode of the first controllable switch is coupled to an output terminal of the converter control circuit.

Since the first controllable switch needs to be rendered conductive when the operation of the DC-DC converter is stopped, it is efficient to control both the operation of the DC-DC converter and the conductive state of the first controllable switch, using the converter control circuit of the DC-DC converter.

In yet another preferred embodiment of a LED light source according to the invention, the standby mode is entered by stopping the operation of the DC-DC converter, and the further control circuitry used for rendering the further controllable switch non-conductive in case the LED light source is in standby mode, is comprised in a converter control circuit comprised in the DC-DC converter, and the control electrode of the further controllable switch is coupled to a second output terminal of the converter control circuit.

Since also the further controllable switch needs to be rendered conductive when the operation of the DC-DC converter is stopped, it is efficient to control both the operation of the DC-DC converter and the conductive state of the further controllable switch, using the converter control circuit of the DC-DC converter.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
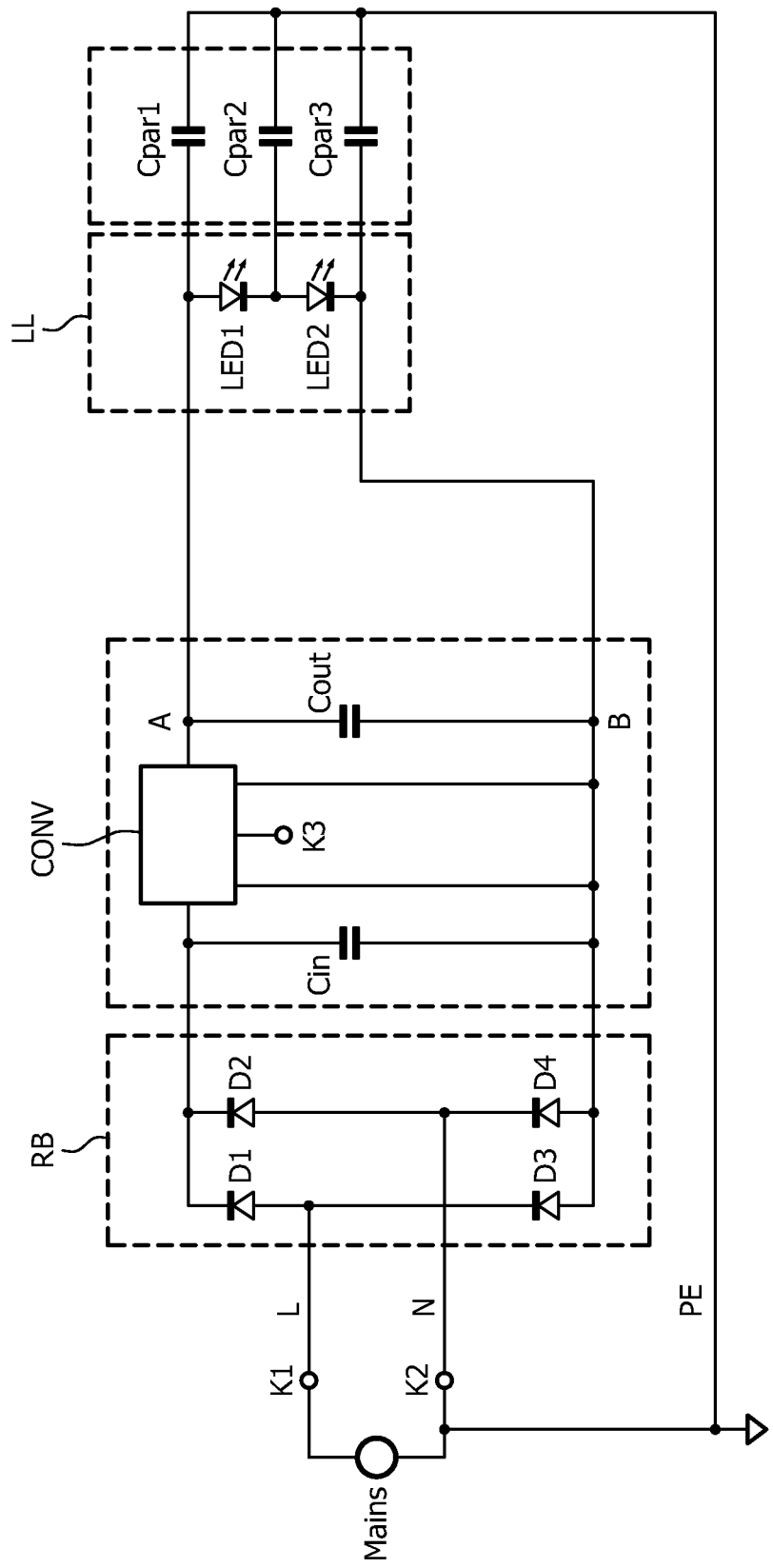
FIG. 1 shows a schematic representation of an embodiment of a LED light source according to the prior art, and FIGS. 2-5 respectively show schematic representations of a first, second and third embodiment of a LED light source according to the invention.

In FIGS. 1, K1 and K2 are input terminals for connection to a mains supply source. Diodes D1-D4 form a rectifier RB comprising rectifier output terminals. The rectifier output terminals are connected to respective converter input terminals of a DC-DC converter CONV for generating a DC-current out of the rectified mains supply voltage. The converter CONV comprises a first converter output terminal A and a second converter output terminal B. The converter input terminals are connected by means of a capacitor Cin and the first and second converter output terminals are connected by means of a capacitor Cout.

Converter CONV is equipped with an input terminal K3 for receiving a control signal that activates or stops the operation of a converter control circuit comprised in the DC-DC converter and thereby, respectively, starts the operation of the LED light source or causes the LED light source to go into standby mode. The control signal can for instance be generated by light control circuitry in a lighting system of which the LED light source forms part.

The first converter output terminal A is connected to an anode of a LED load LL. In FIG. 1, the LED load LL is schematically represented by two LEDs, LED1 and LED2. In practice, the LED load will generally comprise a far higher number of LEDs. A cathode of the LED load LL is connected to the second converter output terminal B.

The LED light source shown in FIG. 1 is very suitable to be used in a luminaire. For safety reasons such a luminaire is usually connected to a protective earth PE, which in turn is connected to the "neutral" of the mains supply source. The inventor has found that the LED load often couples with the luminaire and thus also with the protective earth PE by means of parasitic capacitances. The parasitic capacitances are schematically represented in FIG. 1 as Cpar1, Cpar2 and Cpar3.

During normal operation of the LED light source shown in FIG. 1, the mains supply voltage is rectified by rectifier RB, and DC-DC converter CONV generates, out of the rectified mains supply voltage, a DC current that is supplied to the LED load LL. This DC current causes the LEDs to generate light.

However, in case a control signal that stops the operation of the DC-DC converter is received at terminal K3, the DC current that flows through the LEDs is no longer generated and the LED light source is in standby mode.

Since the input terminals of the LED light source are still connected to the mains supply source, the parasitic capacitances coupling the protective earth to the LED load cause an AC leakage current to flow.

In case the voltage at terminal K2 is higher than the voltage at terminal K1, a first current flows from terminal K2 through parasitic capacitance Cpar3 and diode D3 to input terminal K1. A second current flows from input terminal K2, through Cpar2, LED2 and diode D3 to input terminal K1. A third current flows from terminal K2, through parasytic capacitance Cpar1, capacitor Cout and diode D3 to input terminal K1. These currents charge the parasitic capacitances.

In case the voltage at input terminal K1 is higher than that at input terminal K2, a current flows from terminal K1, through diode D1 and capacitor Cin to converter output terminal B. From converter output terminal B a first current flows through capacitor Cout and parasitic capacitance Cpar1 to input terminal K2. A second current flows from converter output terminal B through capacitor Cout, LED1 and parasitic capacitance Cpar2 to input terminal K2. A third current flows from converter output terminal B through parasitic capacitance Cpar3 to terminal K2. These currents discharge the parasitic capacitances.

The leakage current thus flows through the parasytic capacitances and also partly through the LEDs and thereby causes the LEDs to generate a small amount of light that is considered undesirable.

Figure 2:
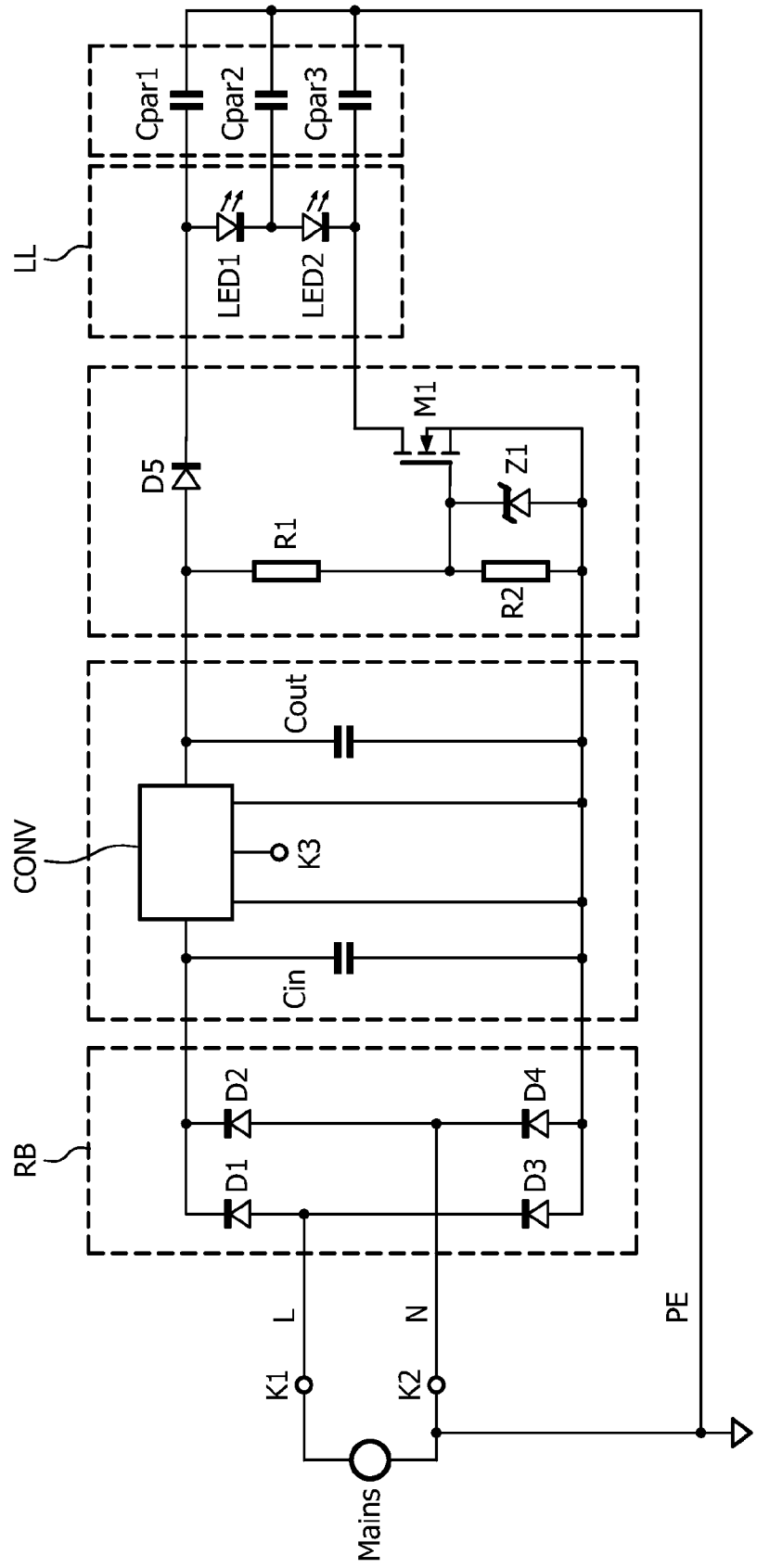

The LED light source shown in FIG. 2 differs from the prior art LED light source shown in FIG. 1 in that the LED light source of FIG. 2 further comprises resistors R1 and R2, diode D5, first controllable switch M1 and zener diode Z1. In the embodiment shown in FIG. 2, the first controllable switch is a FET. The converter output terminals of DC-DC converter CONV are connected by means of a series arrangement of resistor R1 and resistor R2. A common terminal of resistor R1 and resistor R2 is connected to a control electrode of first controllable switch M1 and resistor R2 is shunted by zener diode Z1. Resistor R1, resistor R2 and zener diode Z1 together form first control circuitry for rendering the controllable switch M1 non-conductive in case the operation of the DC-DC converter is stopped and the LED light source is in standby mode.

During normal operation of the LED light source shown in FIG. 2, the voltage across capacitor Cout and thus across the series arrangement of resistor R1 and resistor R2 is high enough to maintain the first controllable switch M1 in a conductive state. As a consequence, the normal operation of the LED light source shown in FIG. 2 is very similar to the normal operation of the prior art LED light source shown in FIG. 1, since the diode D5 and the controllable switch M1 conduct the DC current generated by the DC-DC converter CONV.

In case the DC-DC converter receives a control signal at its terminal K3 to change from normal operation to standby mode, the operation of the DC-DC converter is stopped, the DC current supplying the LED load is no longer generated and the voltage between the converter output terminals decreases so that the first controllable switch M1 becomes non-conductive. Diode D5 and the body diode of controllable switch M1 block the leakage current, so that the parasitic capacitances are no longer charged and discharged, and the LEDs no longer generate a small amount of light, when the LED light source is in standby mode, so that the glow effect is effectively suppressed.

It is noted that in case the diode D5 were dispensed with, the LEDs would still generate a small amount of light. This is because the LEDs would carry a reverse current flowing from their cathode to their anode for a high momentary magnitude of the mains voltage, when the voltage at terminal K2 is higher than the voltage at terminal K1. This current charges the parasitic capacitances. The LEDs would subsequently carry a current discharging the parasitic capacitances and flowing from their anode to their cathode in case the voltage at terminal K1 is higher than the voltage at terminal K2. In the embodiment shown in FIG. 2, the reverse current flowing through the LEDs is blocked by diode D5.

Figure 3:
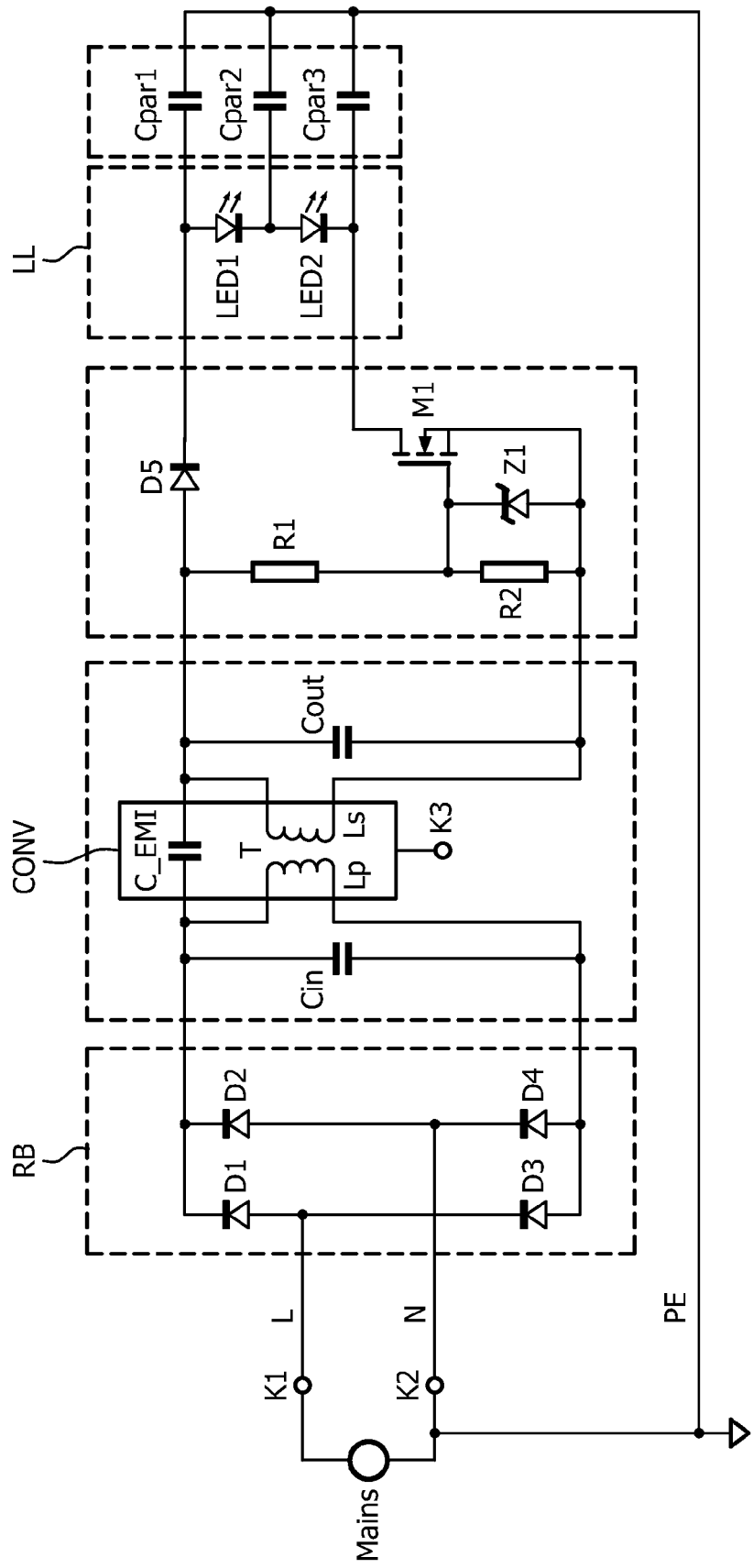

The embodiment shown in FIG. 3 differs from that shown in FIG. 2 in that the DC-DC converter comprises a transformer T with a primary winding Lp and a secondary winding Ls. The primary winding Lp is connected to the secondary winding Ls by means of a capacitor C-EMI to suppress interference. Because of the presence of the transformer, the LED driver is an isolated LED driver, meaning that the circuitry and the LEDs on the secondary side of the transformer are isolated from the mains supply.

The operation of the LED light source shown in FIG. 3 is very similar to that of the LED light source shown in FIG. 2. The only difference is that in the standby state, the capacitor C-EMI will also be charged to a DC voltage.

Figure 4:
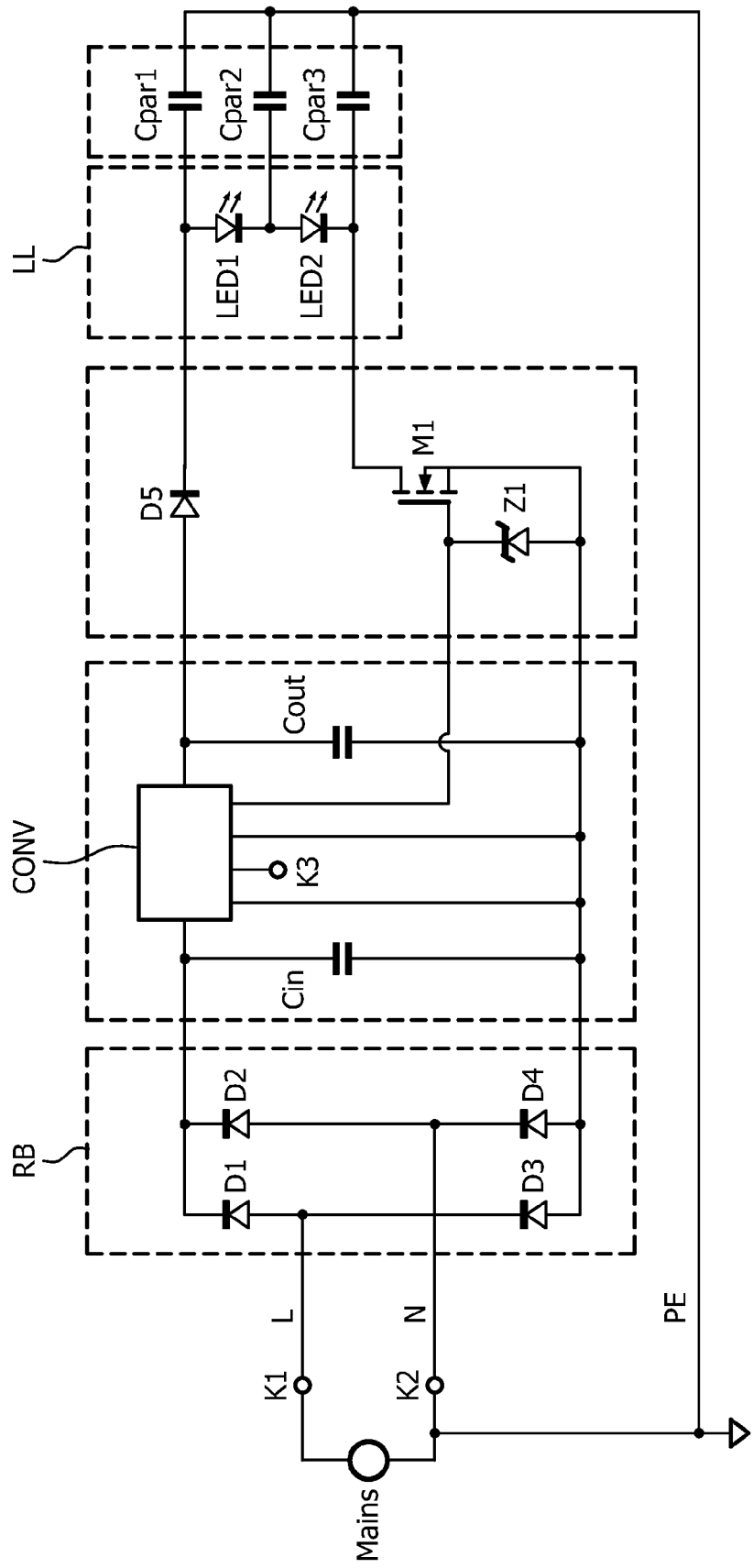

The LED light source shown in FIG. 4 differs from the one shown in FIG. 2 in that resistors R1 and R2 are dispensed with and that the conductive state of controllable switch M1 is controlled by a signal at a third output terminal of DC-DC converter CONV. When the operation of the DC-DC converter is stopped and the LED light source is in standby mode, the signal at this third output terminal renders the controllable switch M1 non-conductive.

Figure 5:
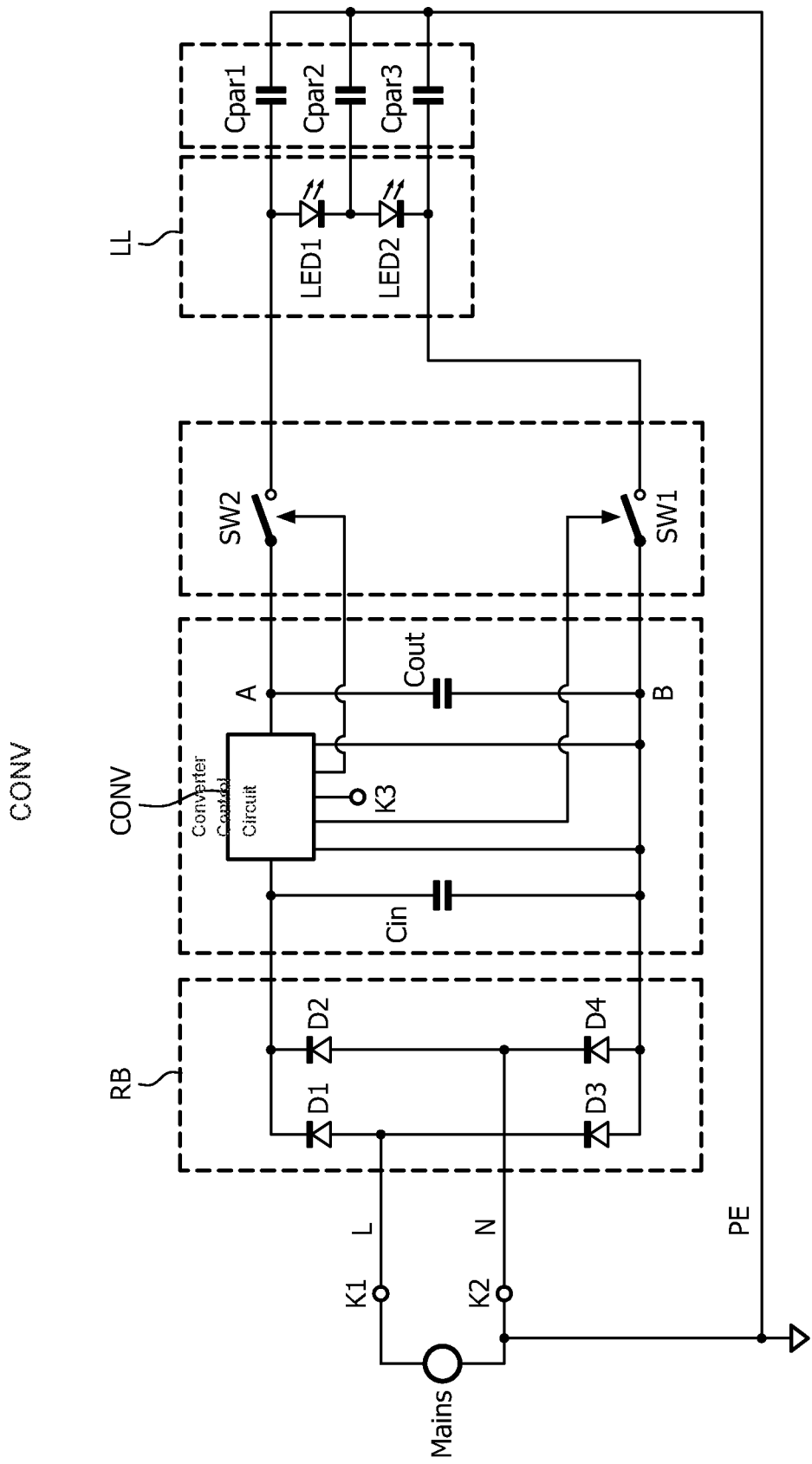

The LED light source shown in FIG. 5 differs from that shown in FIG. 4 in that diode D5 has been replaced by a further controllable switch SW2. The FET forming the first controllable switch has been replaced by a more general symbol for the first controllable switch and zener diode Z1 is dispensed with. The first controllable switch and the further controllable switch are controlled by means of, respectively, a signal present at a third output terminal and a signal present at a fourth output terminal of DC-DC-converter CONV. To this end, switches SW1 and SW2 are connected to, respectively, the third and the fourth output terminal of the DC-DC converter CONV. When the LED light source is in standby mode, the switches SW1 and SW2 are both rendered non-conductive. Switches SW1 and SW2 may be formed by any type of switch, such as a FETs or a relais or another type of switch. It is noted that in case one or both of the controllable switches are implemented by a relais, current conduction in both directions is blocked when the switch is rendered non-conductive. Also in this case an effective suppression of the leakage currents is realized.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light emitting diode (LED) light source, comprising:
   input terminals for connection to a mains voltage supply source to receive a mains supply voltage,
   a rectifier coupled to the input terminals for rectifying the mains supply voltage supplied by the mains supply voltage source and comprising rectifier output terminals,
   a DC-DC converter for generating a DC current out of the rectified mains supply voltage, comprising converter input terminals connected to the rectifier output terminals and comprising a first converter output terminal and a second converter output terminal,
   a LED load with an anode coupled to the first converter output terminal via a current control element for blocking a current flowing from the anode of the LED load to the first converter output terminal, and with a cathode coupled to the second converter output terminal via a first controllable switch having a control electrode coupled to first control circuitry for rendering the controllable switch non-conductive in case the LED light source is in standby mode,
   wherein the first control circuitry comprises a voltage divider comprising a series arrangement of a first resistor and a second resistor connecting the first converter output terminal to the second converter output terminal and the control electrode of the controllable switch is coupled to a terminal between the first resistor and the second resistor.

2. The LED light source of claim 1, wherein the current control element is a diode.

3. The LED light source of claim 1, wherein the current control element is a further controllable switch having a control electrode coupled to further control circuitry for rendering the further controllable switch non-conductive in case the LED light source is in standby mode.

4. The LED light source of claim 3, wherein the further controllable switch comprises a FET.

5. The LED light source of claim 3, wherein the first controllable switch and the current control element each comprise a relay.

6. The LED light source of claim 3, wherein the standby mode is entered by stopping the operation of the DC-DC converter, and wherein the further control circuitry for rendering the further controllable switch non-conductive in case the LED light source is in standby mode, is comprised in a converter control circuit comprised in the DC-DC converter and the control electrode of the further controllable switch is coupled to a second output terminal of the converter control circuit.

7. The LED light source of claim 1, wherein the first controllable switch comprises a FET.

8. The LED light source of claim 1, wherein the DC-DC converter comprises a transformer equipped with a primary winding and a secondary winding and a capacitor is coupled between the primary winding and the secondary winding.

9. The LED light source of claim 1, wherein the first control circuitry further comprises a Zener diode connected between the control electrode of the first controllable switch and the second converter output terminal.

10. The LED light source of claim 1, wherein the mains voltage supply source has a first terminal, a neutral terminal, and a protective earth terminal connected to the neutral terminal, wherein the input terminals of the LED light source include a first input terminal connected to the first terminal of the mains voltage supply source and a second input terminal connected to the neutral terminal of the mains voltage supply source, the LED light source further having a parasitic capacitance between the LED load and the protective earth terminal of the mains voltage supply source.

11. A device, comprising:
    input terminals for connection to a mains voltage supply source to receive a mains supply voltage,
    a rectifier coupled to the input terminals of the device and having rectifier output terminals, the rectifier being configured to rectify the mains supply voltage and to output a rectified mains supply voltage via the rectifier output terminals;
    a DC-DC converter having converter input terminals connected to the rectifier output terminals to receive the rectified mains supply voltage, and having a first converter output terminal and a second converter output terminal configured to supply a DC current in response to the rectified mains supply voltage;
    a light emitting diode (LED) load with an anode and a cathode;
    a current control element having a first terminal connected to the first converter output terminal and a second terminal connected to the anode of the LED load to the first converter output terminal, the current control element being configured to allow the DC current to flow from the first converter output terminal to the anode of the LED load and to block a leakage current from flowing from the anode of the LED load to the first converter output terminal;
    a controllable switch having a first terminal connected to the cathode of the LED load and a second terminal connected to the second converter output terminal, and further having a control electrode for selectively turning on the controllable switch to allow the DC current to flow from the cathode of the LED load to the second converter output terminal through the controllable switch, and turning off the controllable switch to prevent a parasitic current from flowing through the LED load via the controllable switch when the device is in a standby mode wherein the DC current is not supply the DC-DC converter; and
    a resistor voltage divider comprising:
        a first resistor connected between the first converter output terminal and control electrode of the controllable switch, and
        a second resistor connected between the control electrode of the controllable switch and the second converter output terminal.

12. The device of claim 11, further comprising a Zener diode connected between the control electrode of the first controllable switch and the second converter output terminal.

13. The device of claim 11, wherein the device is a luminaire, and wherein the mains voltage supply source has a first terminal, a neutral terminal, and a protective earth terminal connected to the neutral terminal, wherein the input terminals of the LED light source include a first terminal connected to the first terminal of the mains voltage supply source and a second terminal connected to the neutral terminal of the mains voltage supply source, wherein the luminaire is also directly connected to the protective earth terminal, the luminaire further having a parasitic capacitance between the LED load and the protective earth terminal of the mains voltage supply source.

14. The device of claim 11, wherein the DC-DC converter includes a converter control circuit having an output terminal, and wherein the current control element comprises a further controllable switch, the further controllable switch having a control electrode connected to the output terminal of the converter control circuit for rendering the further controllable switch non-conductive in case the device is in the standby mode.

15. The device of claim 11, wherein the controllable switch is a field effect transistor (FET), wherein the control electrode is a gate of the FET, and wherein the first resistor is connected directly to the first converter output terminal and also connected directly to the gate of the FET.

* * * * *